Figure 5:
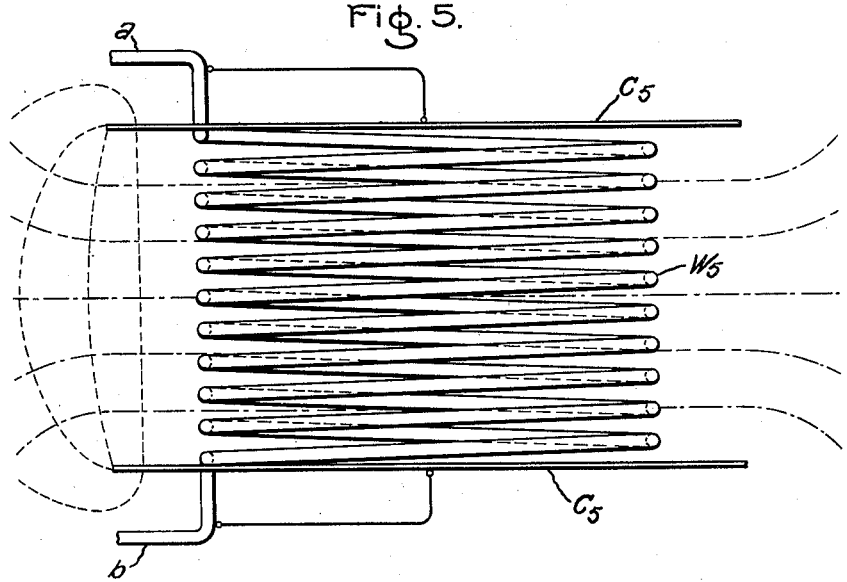

May 18, 1926.
J. M. WEED
ELECTRICAL APPARATUS
Filed Jan. 29, 1920
1,585,448
11 Sheets-Sheet 1
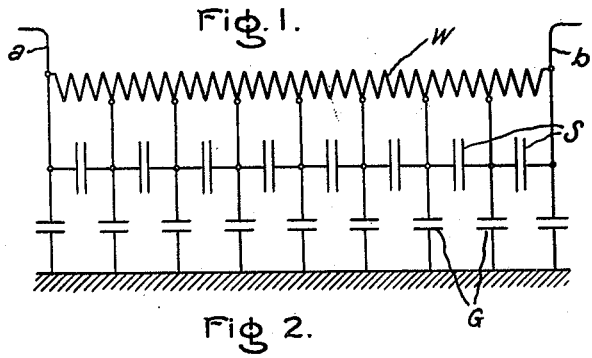
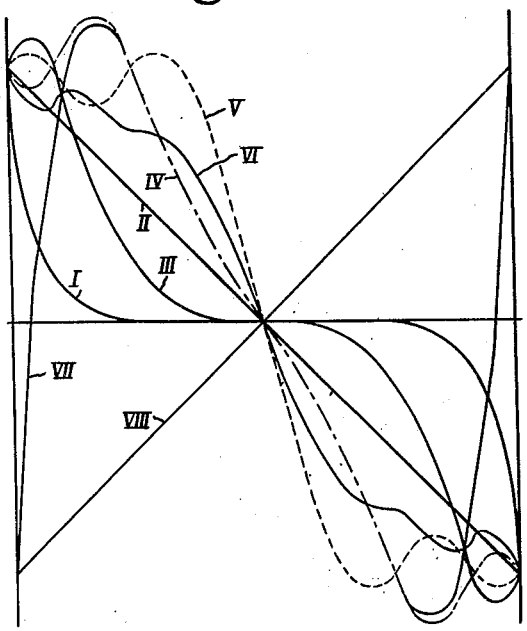
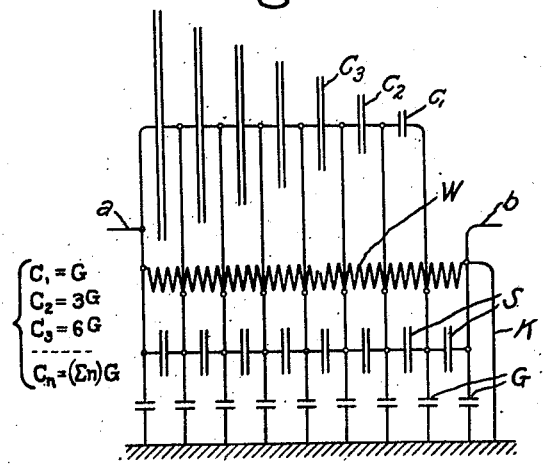
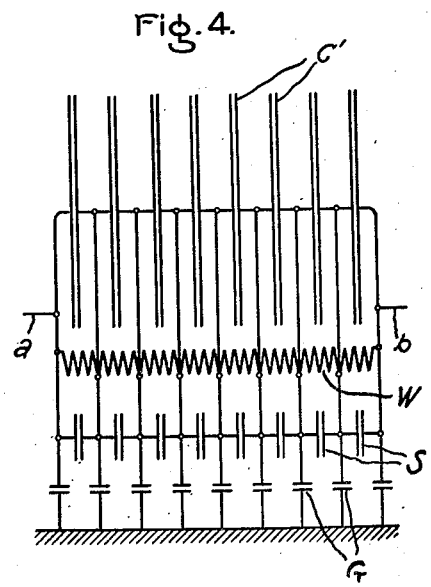
Inventor:
James M. Weed,
by *Albert G. Davis*
His Attorney.

May 18, 1926.

J. M. WEED

ELECTRICAL APPARATUS

Filed Jan. 29, 1920 11 Sheets-Sheet 3

1,585,448

Inventor:
James M. Weed,
by *Albert G. Davis*
His Attorney.

Inventor:
James M. Weed,
by
His Attorney.

May 18, 1926.

J. M. WEED

ELECTRICAL APPARATUS

Filed Jan. 29, 1920    11 Sheets-Sheet 6

1,585,448

Inventor:
James M. Weed,
by *Albert G. Davis*
His Attorney.

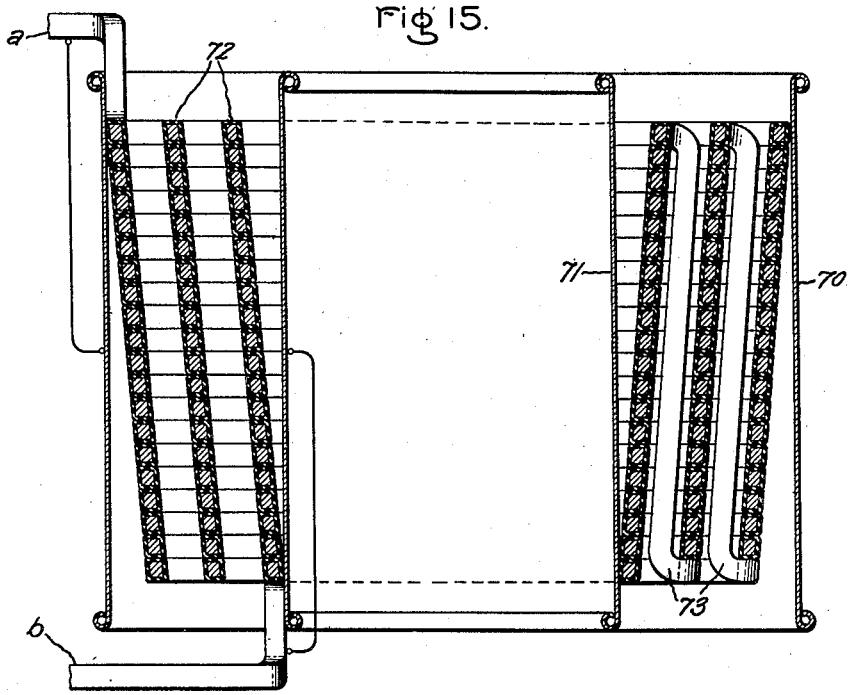
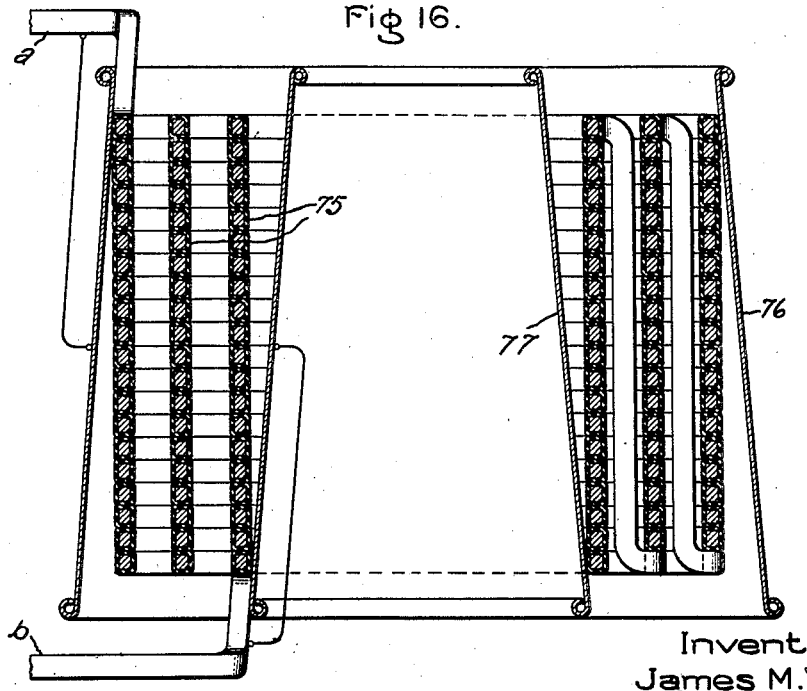

May 18, 1926.
J. M. WEED
ELECTRICAL APPARATUS
Filed Jan. 29, 1920     11 Sheets-Sheet 8
1,585,448
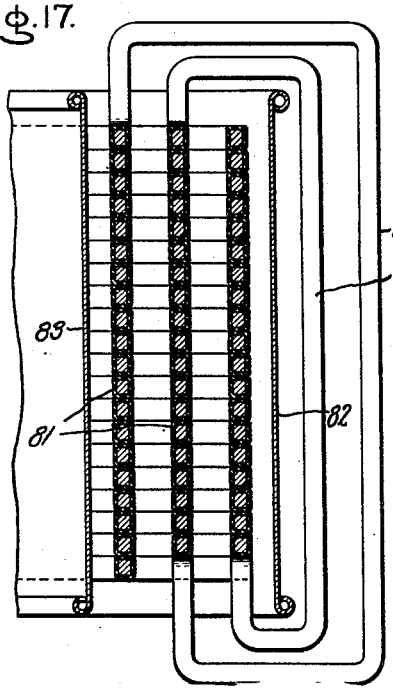
Fig. 17.
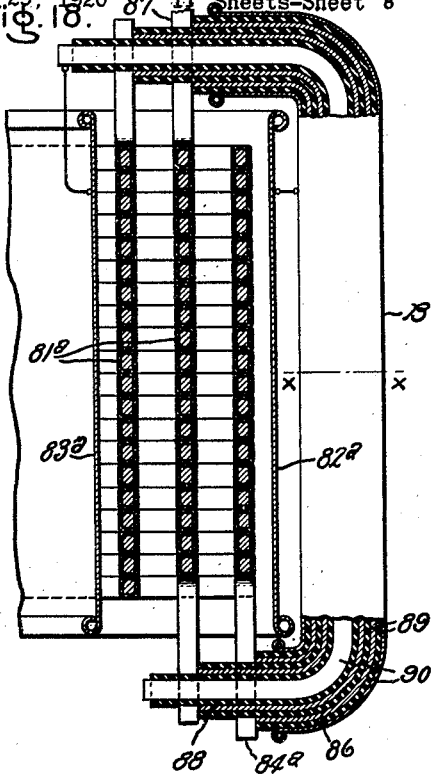
Fig. 18.
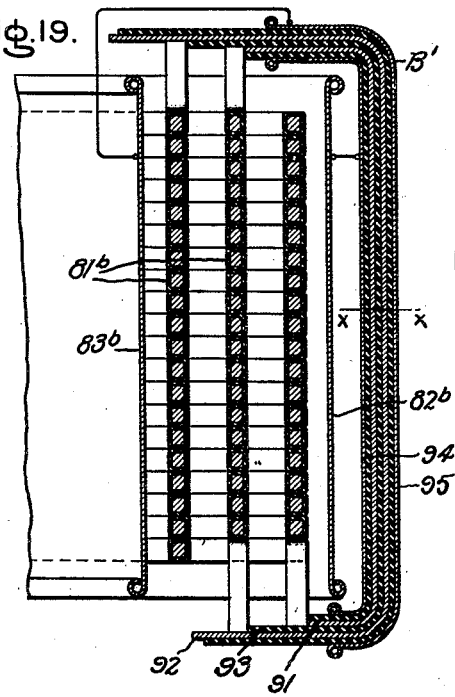
Fig. 19.
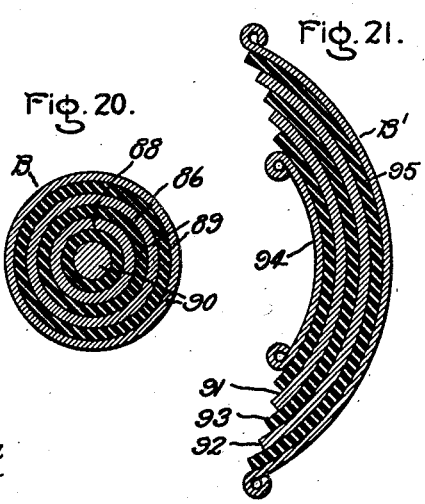
Fig. 20.
Fig. 21.
Inventor:
James M. Weed,
by his Attorney.

May 18, 1926. 1,585,448
J. M. WEED
ELECTRICAL APPARATUS
Filed Jan. 29, 1920 11 Sheets-Sheet 9

Inventor:
James M. Weed,
by *Albert G. Davis*
His Attorney.

May 18, 1926.
J. M. WEED
1,585,448
ELECTRICAL APPARATUS
Filed Jan. 29, 1920    11 Sheets-Sheet 10
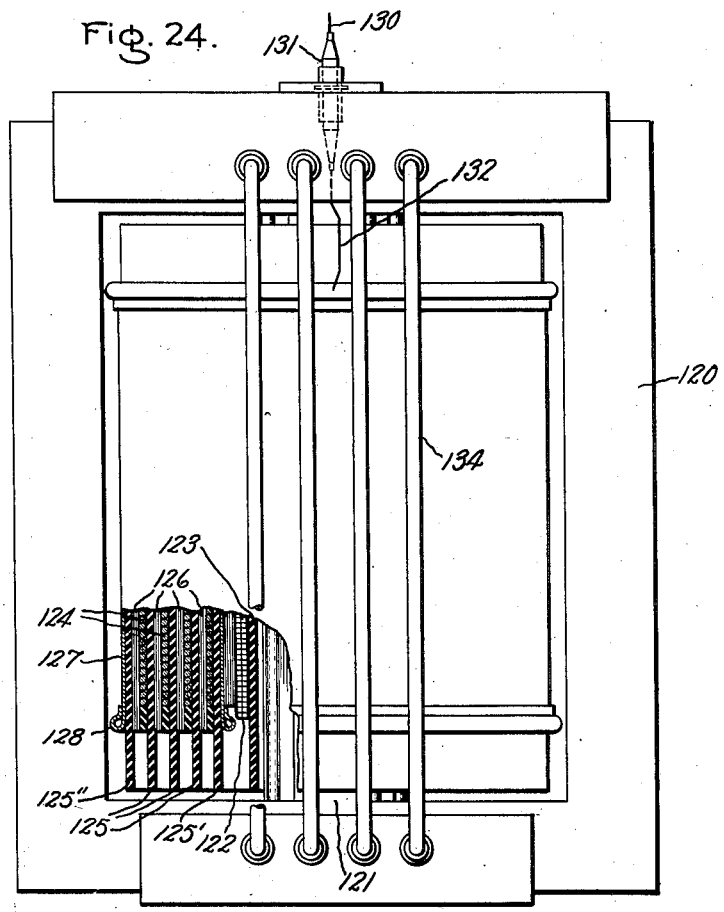
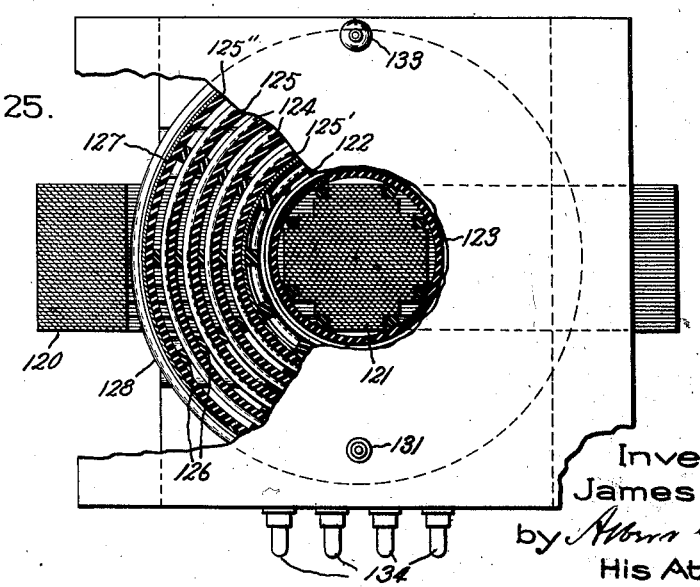
Inventor:
James M. Weed,
by his Attorney.

May 18, 1926.
J. M. WEED
ELECTRICAL APPARATUS
Filed Jan. 29, 1920     11 Sheets-Sheet 11
1,585,448
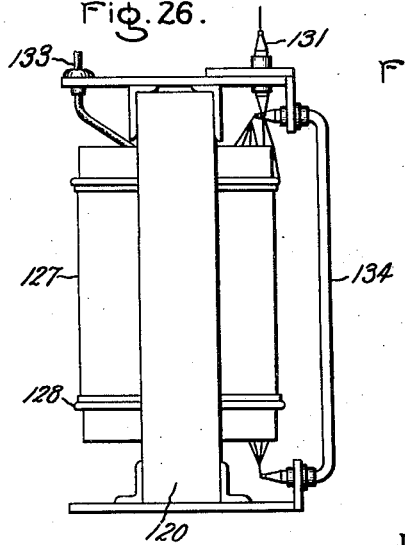
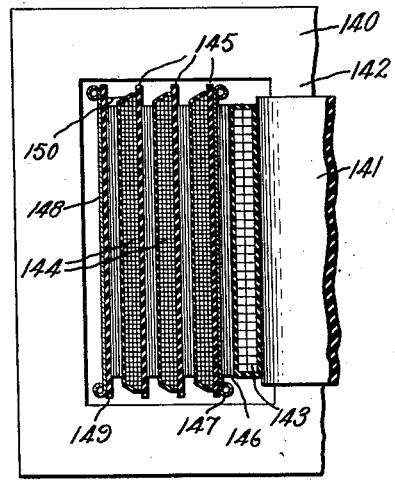
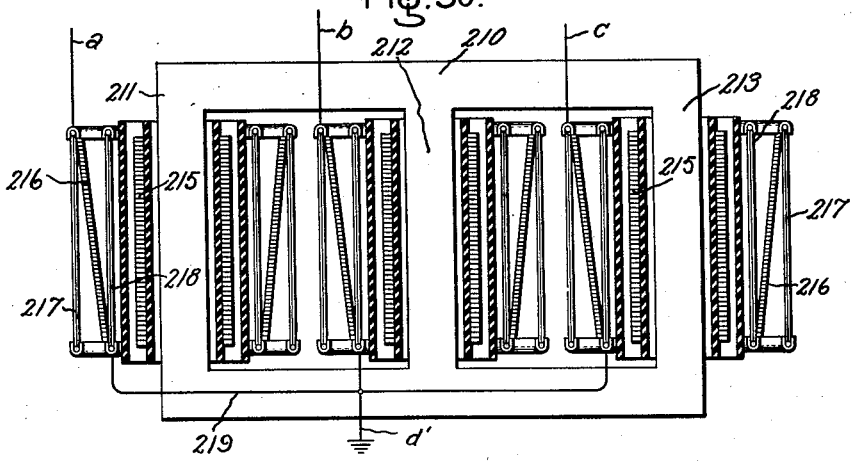
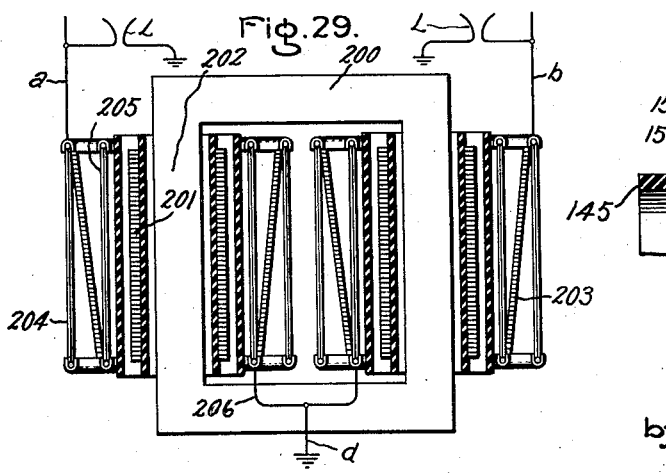
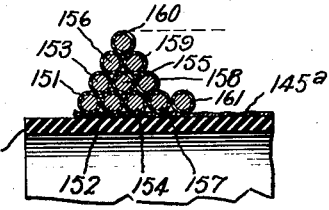
Inventor:
James M. Weed,
by His Attorney.

Patented May 18, 1926.

1,585,448

UNITED STATES PATENT OFFICE.

JAMES M. WEED, OF SCHENECTADY, NEW YORK, ASSIGNOR TO GENERAL ELECTRIC COMPANY, A CORPORATION OF NEW YORK.

ELECTRICAL APPARATUS.

Application filed January 29, 1920. Serial No. 354,896.

My invention relates to windings for electrical apparatus or coils for connection in electrical circuits, and has for its general object an improved construction and arrangement which will avoid the production of excessive transient voltage stresses within the windings.

More particularly my invention relates to windings for electrical apparatus such as transformers, reactors and the like, which primarily possess high inductance, but which also unavoidably possess an appreciable amount of capacitance or electrostatic capacity; and a specific object of my invention is so to associate capacitance with the inductance as to eliminate the possibility of producing transient potential gradients within the windings which are far from uniform.

It is known, as pointed out in my paper appearing on page 2197 (Part II) of the Transactions of the A. I. E. E. for 1915, that in a winding such as is ordinarily found in transformers, when the voltage across the terminals is suddenly or quickly changed, as when a switch is closed or a steep wave front of voltage comes in from the line, at the first instant a transient potential gradient is produced within the winding which is far from uniform, and which is followed by internal oscillations of high frequency, due to the fact that in order to produce the final uniform potential gradient the charging of elements of capacity must take place by the flow of current through elements of inductance. The general nature of this phenomenon of internal oscillations is that which is well known in connection with a charging of condensers through inductances when the voltage is suddenly applied. Its result is a continuous wave-like variation of the potential gradient, the amplitude of the waves being gradually diminished as the gradient approaches its final uniform slope. Transient differences of potential or voltages are thus produced across small portions of the winding which are very large as compared with the corresponding voltage differences with a uniform distribution of voltage, and which vary in their position throughout the period of the oscillation. This results in voltage stresses between adjacent parts of the winding which are excessive as compared with the stresses during normal operation. If, now, a succession of sudden voltage changes occurs at the terminals of the winding, the resulting internal oscillations may be augmented, producing voltage stresses which are much greater than those produced by a single voltage change of the same magnitude. Such a succession of voltage changes may consist in a number of separate independent changes due to any causes and occurring in any order whatsoever, or they may consist in so-called high frequency wave trains impressed upon the winding by oscillatory discharges. The stresses produced in this manner are most severe when the frequency of the wave train impressed upon the winding is the same as that of the oscillations produced within the winding by a single abrupt voltage change. This is called the natural or resonant frequency of the winding or of some resonating portion thereof.

Dangerous internal voltage stresses may thus be produced within ordinary windings either by large sudden changes in the voltage at the terminals, or by high frequency wave trains such as are produced by oscillatory discharges.

Ordinary lightning arresters for restricting the voltages at the terminals of transformers to safe values do not prevent sudden voltage changes. In fact, the discharges taking place across these arresters when excessive voltages appear are actually instrumental in producing large sudden voltage changes, and if these discharges are oscillatory in character, a high frequency wave train is the result. Dangerous conditions thus actually may be produced by the lightning arresters themselves.

It has been common practice to try to insulate for the excessive internal voltage stresses produced in this manner. Difficulty arises, however, due to the fact that the normal uniform voltage distribution affords no criterion for the amount of insulation required. The amount of insulation to be employed in any given instance must be based upon experience and judgment. In deciding this matter, the designer is influenced on the one hand by his desire to produce a safe transformer, and on the other hand by the fact that increased insulation results in an increase in cost much greater than the increase in the cost of insulation. Any increase in insulation in the windings results in corresponding increases in the amounts of copper and iron, since the mean lengths of turns and of magnetic circuit must be increased to reach around the increased amount of insulation. This results not only in increased cost, but also in reduced efficiency and poorer regulation.

The designer knows that many transformers are never or seldom subjected to very severe voltage disturbances, and he has no way of knowing what may be the severity of the disturbances which arise in any particular case. He usually tries, therefore, to pursue a conservative middle course which will reduce the number of transformers which fail for lack of sufficient insulation as much as possible without unduly penalizing the cost and injuring the performance. The result is that while transformers, as a general rule, cost much more than they would if insulated only for normal voltages with uniform distribution, still they cannot be said to be safe under the worst conditions of service.

By means of my invention I am able to eliminate all such internal voltage disturbances, making it only necessary to insulate for normal voltages with uniform potential gradients, using a sufficient factor of safety to take care of inequalities in the insulating materials. By normal voltages I here mean the nominal operating voltages plus such percentages of increase as may be permitted at the terminals by lightning arresters such as are used in good practice. I am thus able to produce a transformer which on the one hand costs less than the ordinary transformer, and which, on the other hand, when used in connection with lightning arresters which limit the voltages at the terminals to safe values, are absolutely safe.

In the practice of my invention, I employ the principle, which I have discovered, that if the capacitance associated with the inductance of any winding be disposed in such a manner that the potential gradient which would be produced by the capacitance alone is the same as that which would be produced by the inductance alone, then no transient excess voltages or oscillations will be produced. The potential gradient from the first instant will be that found in the normal operation of the winding. This principle applies not only to windings for transformers, but also to reactors or to any other kind of electrical windings.

This favorable disposition of capacitance with inductance in windings may be effected by means of condensers connected to and disposed with respect to the windings in such manners as are hereinafter set forth in detail.

Figure 6:
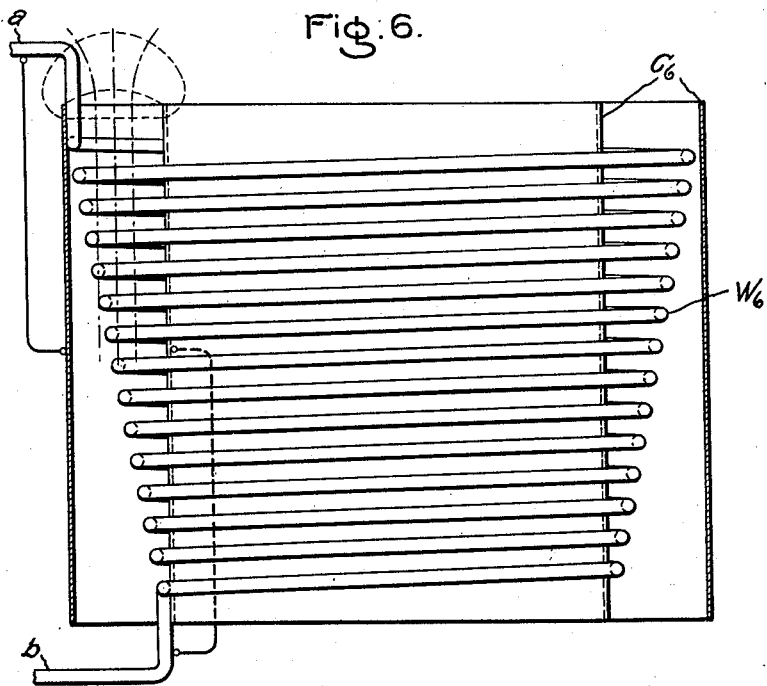
Figure 7:
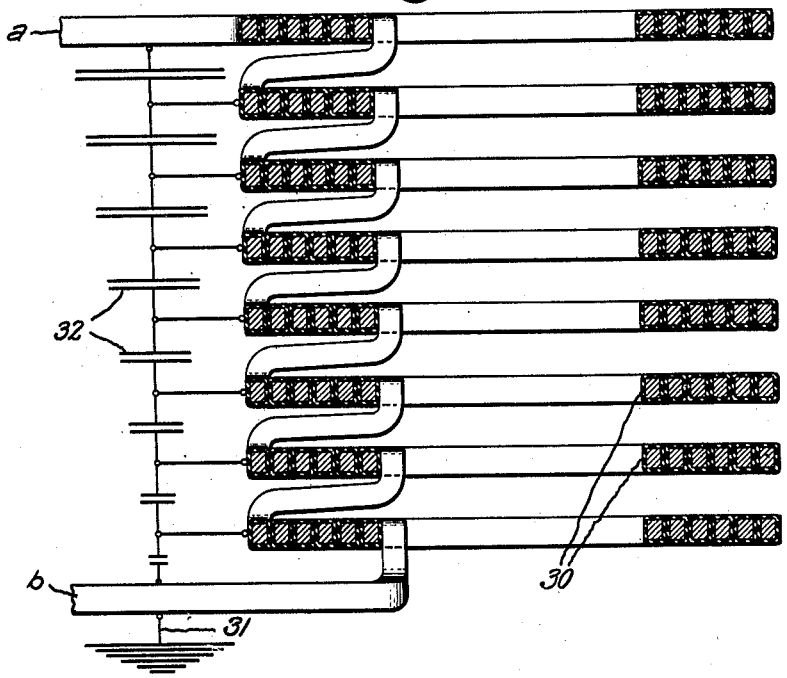
Figure 8:
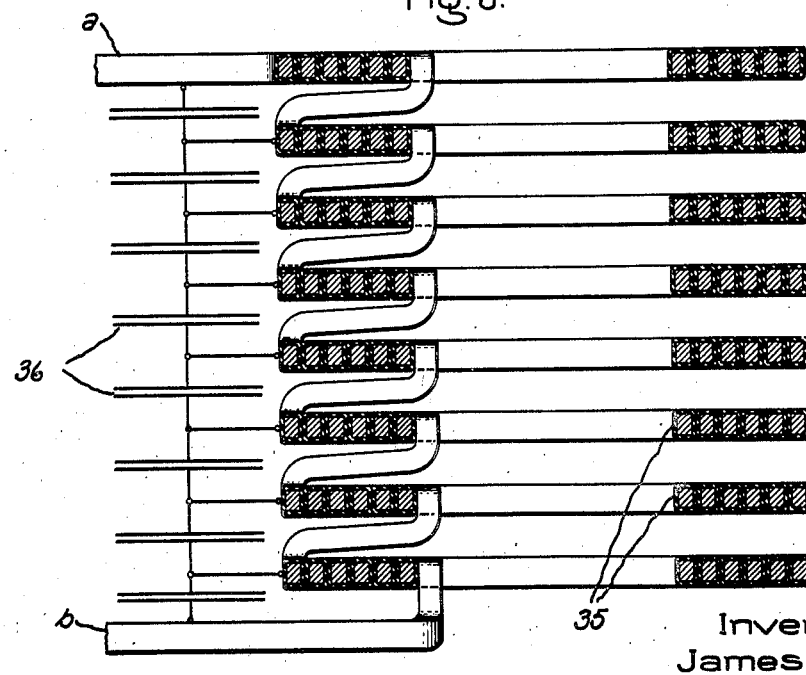
Figure 9:
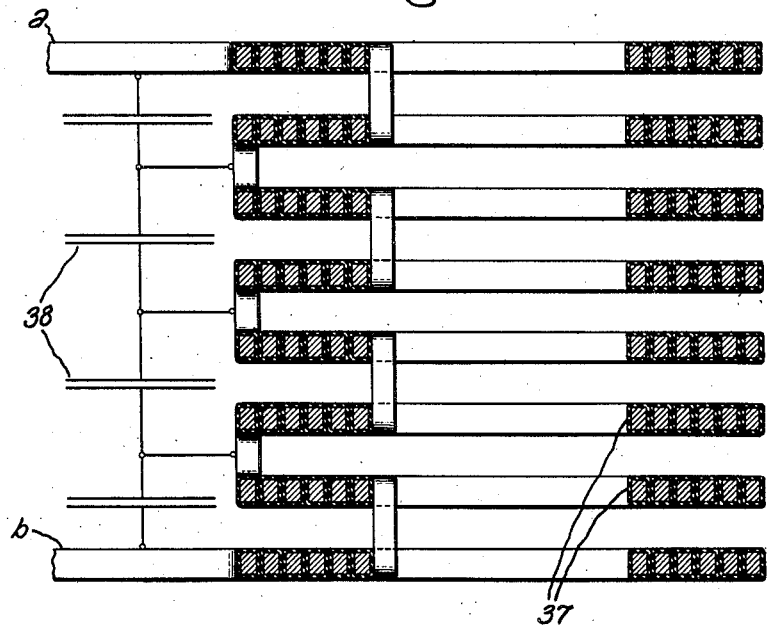
Figure 10:
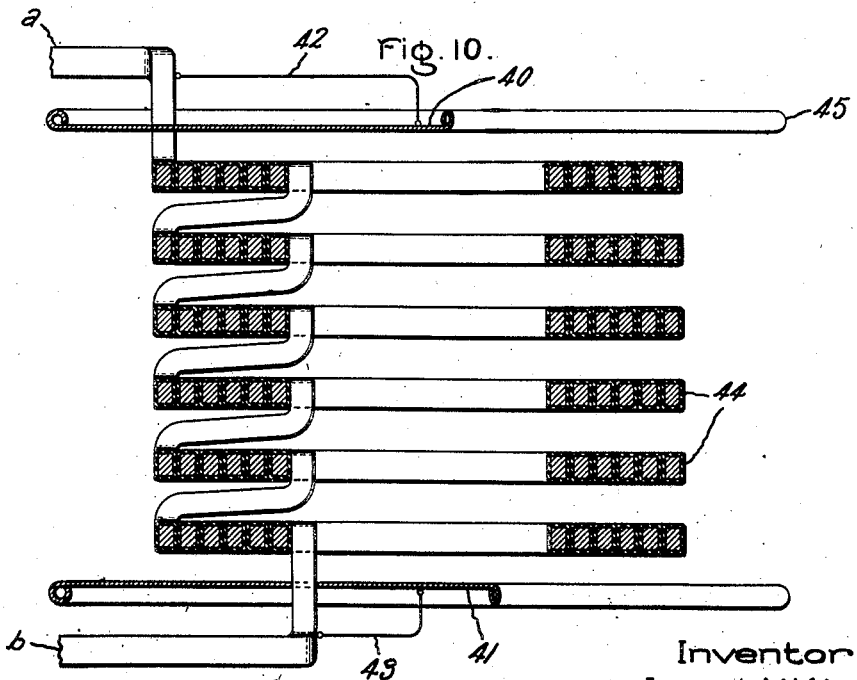
Figure 11:
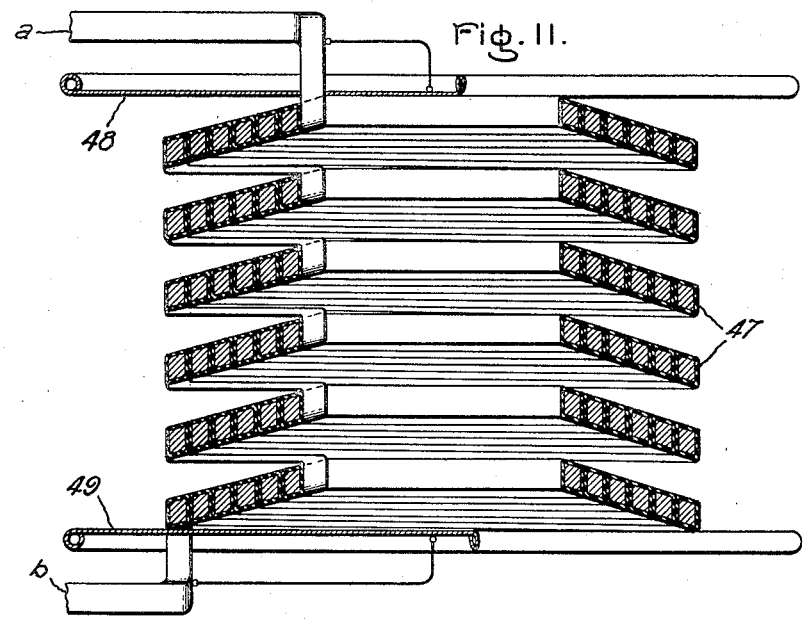
Figure 12:
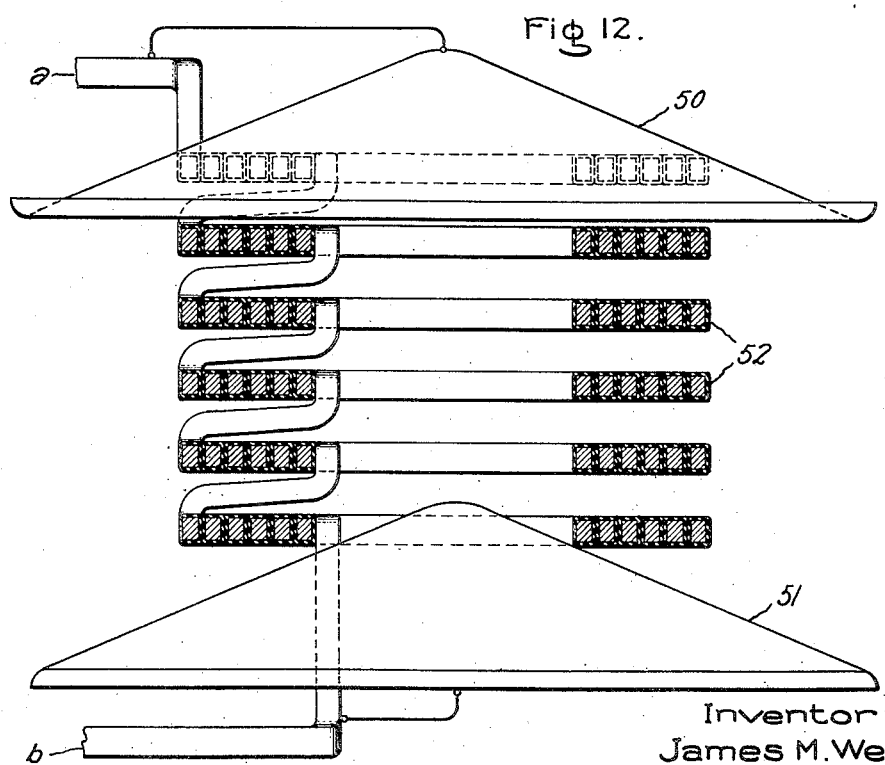
Figure 22:
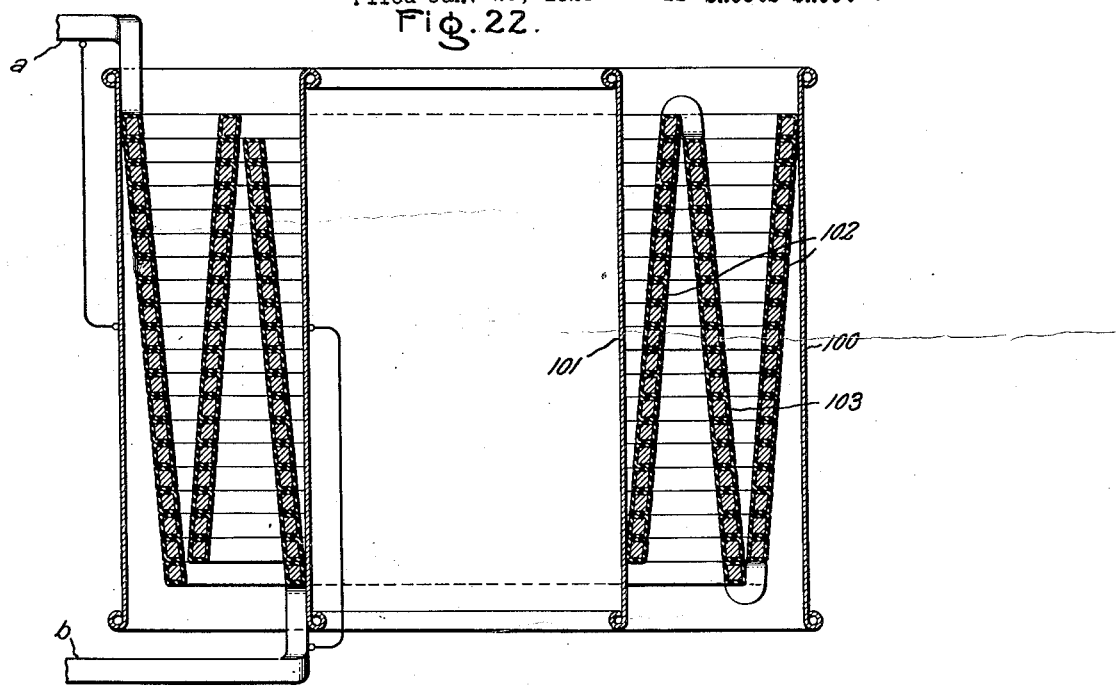
Figure 23:
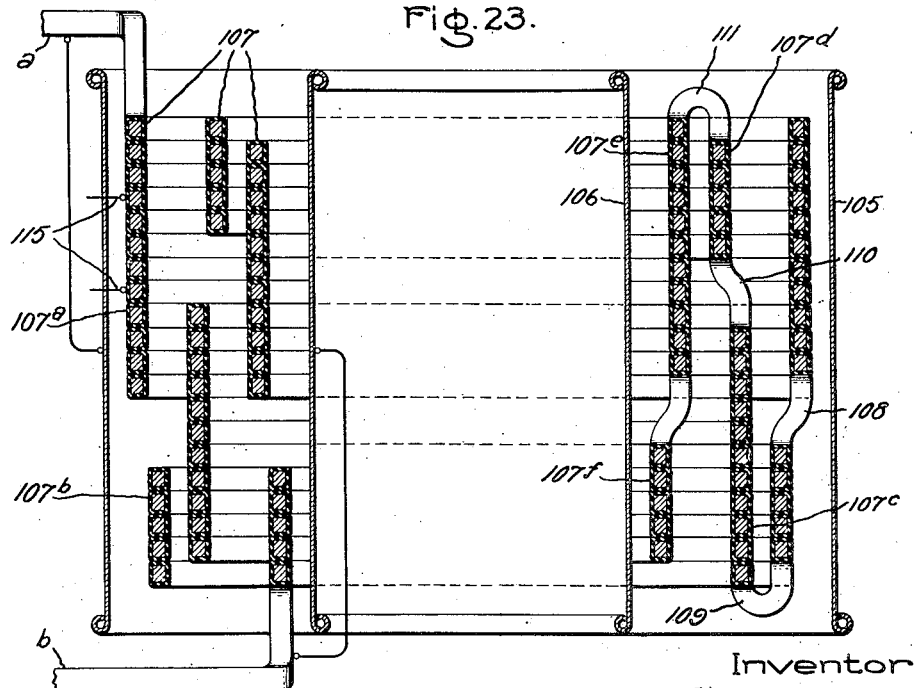

For a more complete understanding of the nature and objects of my invention, reference should be had to the following description taken in connection with the accompanying drawings in which:

Fig. 1 is a diagrammatic representation of a purposely assumed simplified distribution of capacitance with inductance which is found in certain types of winding. Fig. 2 is a diagram showing plots of potential gradients which occur at given instants in a winding having the distribution of capacitance and inductance represented in Fig. 1. Figs. 3 and 4 show diagrammatically methods in accordance with my invention for approximately eliminating the undesirable potential gradients in ordinary windings by the use of condensers connected to the winding externally at suitable points. Figs. 5 and 6 show arrangements of windings and condensers which, more nearly in an ideal manner, will completely eliminate undesirable potential gradients in the windings in accordance with my invention. Fig. 7 shows an embodiment of my invention applied to a disc-coil winding in accordance with the method illustrated in Fig. 3. Figs. 8 and 9 show further applications in accordance with the method illustrated in Fig. 4. Figs. 10, 11 and 12 show applications to disc-coil windings in accordance with the method illustrated in Fig. 5; while Figs. 13 to 16 inclusive similarly show my invention applied to windings ordinarily used in practice in accordance with the method illustrated in Fig. 6. Figs. 17 to 19 inclusive, and Fig. 22, show arrangements for eliminating the disturbing effect of the cross-connections between coils when practicing my invention in accordance with the method illustrated in Fig. 6; while Figs. 20 and 21 show sections on the line X—X in Figs. 18 and 19 respectively. Fig. 23 shows a modification of the arrangement shown in Fig. 22. Figs. 24 to 26 illustrate details of a practical transformer constructed to embody this invention. Figs. 27 and 28 show a winding construction particularly adapted for application in small high voltage transformers. Fig. 29 shows an arrangement of windings embodying this invention adapted for single phase core type transformers with grounded neutral; and Fig. 30 shows an arrangement of windings adapted for polyphase transformers with grounded neutral.

In ordinary electrical windings which are inductively related there is capacitance between any turn and the various other turns, and there is also capacitance between individual turns and adjacent objects or parts. In an ordinary transformer, for instance, which mainly comprises two distinct windings, a core, and a case, the individual windings are ordinarily broken up into a number of separate coils, hence we find capacitances between individual turns in the same coil, capacitances between coils or between the turns of one coil and the turns of another, capacitances between windings or between the turns of one winding and the turns of the other, and capacitances between turns of both windings and the core and case, which may be conventionally designated, "ground". These capacitances vary in amount and in arrangement for different windings, the arrangement in any particular winding depending upon the nature of the design, the designs being based upon other considerations. The electrical behavior of such complicated arrangements of capacitance with inductance, when subjected to sudden voltage changes, is difficult to determine with accuracy; but an insight into its behavior may be obtained by a consideration of the simple limiting case illustrated in Fig. 1.

In Fig. 1, W denotes a winding in which the arrangement of capacitance with inductance is more simple than that really existing in most actual windings, but it serves the purpose of illustration and lends itself to mathematical treatment. Capacitance between turns is diagrammatically indicated as due to the condensers S, while capacitance to ground is similarly indicated as due to the condensers G; assuming that the condensers S are equal and that the condensers G are equal, suppose a voltage E suddenly appears across the terminals $a-b$ of the winding W, and let us examine the resultant consecutive distributions of this voltage E. We will at first consider what would take place if the inductance were absent, due to the action of the condensers. A large impulse of charging current flows between the terminals through the condensers, a part of this current flowing directly through the series of condensers S, while other parts branch from this series path through those condensers G lying nearer one of the terminals, flowing into the ground and returning to the series path through condensers G lying nearer the other terminal. Passing through the winding from one terminal to the other, it is seen that the decrement of the current $i_s$ through the condensers S is the increment of the current $i_g$ through the condensers G. This is expressed mathematically by the equation—

$$\frac{di_s}{dx}\delta x = \frac{di_g}{dx}\delta x \quad (1)$$

$x$ denoting distance along the winding W, and $\delta x$ the increment of distance from one turn to the next, the turns here being assumed to be uniformly distributed with respect to distance.

Now the current $i_s$ between any adjacent pair of turns is the product of the capacity between turns by the rate of change of the voltage between turns with respect to time, or $$i_s = \frac{C_s}{\delta x}l\left\{-\frac{d\left(\frac{de}{dt}\right)}{dx}\delta x\right\} \quad (2)$$

where $C_s$ is the capacitance of the entire series of condensers S, $l$ the length of the winding W, and $e$ is the voltage measured to neutral or ground. Also the current from any turn to ground is—

$$\frac{di_g}{dx}\delta x = \frac{C_g \delta x}{l}\left(\frac{de}{dt}\right) \quad (3)$$

where $C_g$ is the total capacitance to ground.

Differentiating equation (2) gives $$\frac{di_s}{dx} = -C_s l\left\{\frac{d^2\left(\frac{de}{dt}\right)}{dx^2}\right\} \quad (4)$$

Substituting the right hand members of equations (3) and (4) in (1), and integrating with respect to time, we obtain—

$$\frac{d^2e}{dx^2} - \frac{1}{l^2}\left\{\frac{C_g}{C_s}\right\}e = 0 \quad (5)$$

The solution of equation (5) is $$e = A\epsilon^{+\frac{1}{l}\sqrt{\frac{C_g}{C_s}}x} + B\epsilon^{-\frac{1}{l}\sqrt{\frac{C_g}{C_s}}x} \quad (6)$$

where A and B are constants of integration and $\epsilon$ is the base of the Naperian system of logarithms.

The potential gradient along the winding W which would be produced by capacity alone is thus an exponential function of the distance from one or the other of the terminals. Assuming that the potential at the terminal $a$ is ½ E, the potential at $b$, —½ E and letting $x$ be the distance measured from terminal $a$, we may find the constants A and B by making the proper substitutions in equation (6) for $x=o$ and for $x=l$ and solving the two resulting equations. Introducing the values of A and B thus determined, into equation (6), we will obtain the final equation for a potential gradient such as is depicted by curve I in Fig. 2, where the abscissæ denote distances or numbers of turns, and the ordinates denote potentials.

We will now consider what would take place when the voltage E appears suddenly at the terminals of the winding, assuming that the condensers are absent so that the result is due to the action of inductance alone. There is then a gradual and continual growth of current through the inductance beginning at zero in the first instant. Since there are no branch or shunt paths of inductance, this current all flows through the same series path. The rate at which the current grows is $$\frac{di}{dt} = \frac{E}{L} \quad (7)$$

where L is the total inductance of the winding. Passing through the winding from one terminal to the other, under these conditions the rate of change in the potential with respect to distance is $$\frac{de}{dx} = -\frac{L}{l}\frac{di}{dt} \quad (8)$$

Substituting in this the value of $\frac{di}{dt}$ obtained from equation (7) we get $$\frac{de}{dx} = -\frac{1}{l}(E) \quad (9)$$

whence $$e = K - \frac{x}{l} E \quad (10)$$

The constant K in this case is $\frac{E}{2}$, so that—

$$e = \left\{\frac{1}{2} - \frac{x}{l}\right\} E \quad (11)$$

The potential gradient along the winding W which would be produced by the action of inductance alone is therefore a straight line, as depicted by curve II in Fig. 2.

We must now consider the joint effect of the capacitance and the inductance existing together in this winding, since it is evident that the potential gradients depicted by curves I and II in Fig. 2 cannot both exist at the same time.

Any potential gradient involves a corresponding distribution of electricity to charge the capacity of the winding, and electricity can be supplied only by the flow of current. It is therefore evident that the gradient of curve I will obtain at the first instant as a result of the large impulse of current flowing through the condenser system at the first instant, when current is only beginning to grow in the inductance.

It is observed in this curve I of Fig. 2 that the initial voltages across or between turns at the ends of the winding are great, while in the middle portions they are zero. At the start, therefore, current grows rapidly in the end turns, but not at all in the middle turns. This results in a gradual redistribution of electrical charge, and as the distribution of charge and the resulting potential gradient change, the rates of growth of the current in different parts of the winding change also. The result is a very complicated wave like variation of the potential gradient, as illustrated by curves III to VI inclusive which represent the gradient as it occurs at the ends of given consecutive intervals of time. This wave like variation of the potential gradient would continue indefinitely except for certain damping effects due to losses which need not be discussed here, but which cause the gradient to settle down to the straight line curve II. In the meantime excess voltages will have appeared across parts and between adjacent parts throughout the length of the winding, the excess voltages for different parts appearing at different instants of time.

We have thus far considered the behavior of this winding due to a single application of the voltage E suddenly impressed upon it and maintained with uniform value at the terminals. It can be shown that if subsequent sudden changes in voltage occur at the terminals, the resultant voltage gradient for any instant will be that obtained by superposing upon the gradient due to previous applications of voltage that which would have been produced by the new voltage change if impressed upon the winding in an inert condition. That is, when depicted graphically the ordinates of the potential curve at any instant are summations of the corresponding ordinates of the various potential curves which would have resulted at that particular instant if each of the previous voltage changes had occurred without the others, as the application of a sudden voltage having a value equal to the particular change in voltage. Thus, for instance, if the voltage E at the terminals of the winding be suddenly reversed at the instant when the gradient due to the first application of this voltage is that shown by curve IV of Fig. 2, the resultant gradient at the first instant after the change is illustrated by curve VII, while the uniform voltage gradient corresponding to the new voltage is the straight line curve VIII.

Without pursuing this matter further, it is now seen that when a series of sudden voltage changes occur, the departure of instantaneous potential gradients from the uniform gradient may be much greater than that produced by a single sudden application of voltage of corresponding value.

In the manners described above, it is seen how excessive internal voltages may be produced in a winding having this arrangement of capacitance with inductance either by a single large sudden change in voltage at the terminals or by a succession of small changes so timed that the effects are augmented.

From considerations such as have been given above in connection with the arrangement shown in Fig. 1, it will be understood how transient potential gradients and excess internal voltages may be produced by sudden changes in voltage at the terminals of a winding with any arrangement of capacitance with inductance except arrangements in which the potential gradient which would be produced by the capacitance alone is the same, or approximately the same, as that which would be produced by the inductance alone. The potential gradient at the first instant is fixed by the capacitance, while the final gradient is fixed by the inductance. If the final gradient differs from the initial gradient, the necessary readjustment takes place through the medium of damped oscillations. If, however, the final and initial gradients are the same, no readjustment is necessary, and the potential gradient is at all times the same as that which would be produced by the inductance alone, and is the uniform gradient shown in curve II of Fig. 2.

The necessary and sufficient condition that no excess internal voltages should be produced within a winding is, therefore, that capacitance be associated with the inductance in such a manner that the potential gradient which would be produced by the capacitance alone is the same as that which would be produced by the inductance alone, the application of this principle forming the basis of my invention. Another way of stating this condition is to say that the capacitances in parallel with all portions of the inductance should be in inverse proportion with respect to the respective portions of inductance. In practice it is not always important that this condition should be rigidly fulfilled, but only that the approximation be sufficiently close to avoid the necessity for extra insulation to make the winding safe, since slight variations of the potential gradient from the uniform gradient give but small excess voltages.

I will now describe typical arrangements of windings for effecting this fundamental condition.

In Fig. 3 the winding W is symbolically represented as possessing series and shunt capacitances by means of condensers S and G respectively, as in Fig. 1, and has in addition connected thereto the condensers $C_1$, $C_2$, etc. Again it is assumed that the condenser elements S are all equal, the condenser elements G all equal, and the intermediate elements of inductance all equal. If then the condenser elements G were eliminated from the arrangement in Fig. 1, the desired condition would have been fulfilled without further modification; but this is not practicable. The condition is substantially fulfilled in Fig. 3, however, by connecting in external condensers $C_1$, $C_2$, etc., of suitable capacitances provided that one point in the winding is grounded as indicated by the connection K.

The capacitances of the condensers $C_1$, $C_2$, etc. must be such that, in conjunction with the condenser elements G, they will give a uniform potential gradient, as will be understood from the following example; suppose the condenser elements G are all equal, and are connected in at equal intervals throughout the inductance, the desired condition is obtained when the capacitances of condensers $C_1$, $C_2$, $C_3$ etc., are $C_1=G$, $C_2=3G$, $C_3=6G$, etc., or $Cn=(\Sigma n)G$, where G is the capacitance of one of the condenser elements G.

The application of this method of attaining the desired condition is limited, since some point of the winding must be grounded, and its practicability is confined to cases where the capacitances of the condenser elements G are known, and where their locations are known. Moreover, if the condenser elements S are not all equal and connected across equal elements of inductance as assumed, or if their capacitances are not in inverse proportion with respect to the corresponding elements of inductance, then it will be necessary to correct this proportionality by means of additional capacitance in the condensers $C_1$, $C_2$, etc.

Another and more practicable arrangement for effecting this condition is shown in Fig. 4, where external condenser units C' of equal capacitances are connected across the equal elements of inductance of the winding W in Fig. 1. The capacitances of these condenser units C' must be sufficiently large as compared with the capacitances of the condenser elements G, as symbolically indicated by their relative sizes in the diagram of Fig. 4, that the capacitances G will have but small effect upon the potential gradient which would be produced by the total capacitance. This case may be made more general by stating that with any arrangement of inherent capacitance with inductance the possibility of producing excessive internal voltages is substantially eliminated by dividing up the total inductance into a number of fractional parts, and connecting across, i. e. in parallel with, each part of inductance a relatively large added capacitance; these added capacitances being in inverse proportion with respect to the respective parts of the inductance. If all parts of the inductance are equal, the added capacitances must be equal, but if any part of the inductance is large or small as compared with any other part, the added capacitance in parallel with it must be correspondingly small or large when compared with the added capacitance in parallel with the other part. The added capacitances in any case must be sufficiently large as compared with the inherent capacitances that the latter will have but small effect upon the potential gradient which would be produced by the total capacitance. This last described arrangement has the advantage over that disclosed in Fig. 3, in that its successful application does not require that the winding should be grounded at some point, neither does it require any definite knowledge of the amount, nor of the distribution of the inherent capacitances; it being sufficient merely to make the added capacitances large as compared with the inherent capacitances.

In Figs. 5 and 6 there are illustrated two typical examples of another general method of meeting the necessary condition for windings in which no excess internal voltages can be produced. In these cases, the windings $W_5$ and $W_6$ are included within the dielectric spaces between the two plates of the condensers $C_5$ and $C_6$ respectively, the condenser plates being connected to the respective terminals $a$ and $b$ of their windings. The plates of Fig. 5 are parallel plane discs, while those of Fig. 6 are concentric cylinders. In either case, while traversing the winding from one terminal to the other, the turns progress substantially at a uniform rate in space from one plate to the other. Consequently, if a voltage is suddenly applied across the terminals of a winding between such condenser plates, the potential which would exist at any point in the winding due to its position in the dielectric of the condenser is the same as that which would be produced by the action of the inductance. In other words, the potential gradient which would be produced by the capacitance alone is the same as that which would be produced by the inductance alone. The initial and the final potential gradients are therefore the same, and the potential gradient is always uniform.

In Fig. 6, the coincidence of the potential gradients which would result from capacitance alone and from inductance alone will not be accurately effected by a strictly uniform rate of advance of the turns of the winding $W_6$ in space from one condenser cylinder $C_6$ to the other. This is on account of the fact that the equipotential surfaces representing equal steps of potential difference, which are of cylindrical form, are not equidistantly spaced between the cylinders $C_6$. The turn to turn rate of advance in space between cylinders $C_6$, in order to make the potential gradients due to capacitance and inductance exactly coincident, must be that of the electrostatic voltage gradient from one cylinder to the other. This gives a gradually increasing radial distance between turns when passing along the winding from the inner cylinder $C_6$ to the outer one. I have used the term "substantially uniform" hereinafter to imply this order of advance when applied to such windings arranged between concentric cylindrical condenser plates.

In Figs. 7 I have shown an arrangement adapted to disc coil windings when practicing my invention in accordance with the method of Fig. 3. Here the winding is shown as comprising a plurality of coils 30 of strap-conductor connected in series in such wise that the current may pass progressively from the inner edge of one coil to the outer edge of the next when a voltage is impressed across the terminals $a$ and $b$; the terminal $b$ being grounded by means of the connection 31. External capacitances are added by condensers 32, which are connected in series with each other and in parallel individually with the respective coils 30. The capacitance values of the respective condenser units are such as to effect a uniform potential gradient in the manner before pointed out in connection with Fig. 3.

In Fig. 8, I have shown the application of the method of Fig. 4 to disc coil windings which are not grounded. Here the coils 35 and the condensers 36 are connected in the same manner as that shown in Fig. 7, except that in this case there is no ground connection. As pointed out in connection with Fig. 4, individual condensers 36 must be large in comparison to the inherent capacitances of the winding.

In Fig. 9, I have shown the application of the same method as shown in Fig. 8 to disc coils wound alternately in right hand and left hand spirals so as to have adjacent inner turns and outer turns respectively connected together. Here the relatively large condenser units 38 are connected in series with each other and in parallel individually with the respective units of inductance, here shown as consisting of pairs of the coils 37.

In Fig. 10, I have shown the method of Fig. 5 applied in practical form to a simple disc coil winding. Flat disc-like condenser plates 40 and 41, which are respectively connected to the terminals $a$ and $b$ by means of connections 42 and 43, are spaced apart sufficiently to provide a space to receive the coils 44 of the winding. These condenser plates are preferably provided with rolled edges as shown at 45 in order to reduce the concentration of stress thereon, commonly known as the electro-static edge effect. The coils 44 are here all wound alike, each having its inner turn brought through the space between the two coils to connect with the outer turn of an adjacent coil. In this manner there is approximated the substantially uniform progress of the turns in the space from one condenser plate to the other, illustrated in Fig. 5.

In Fig. 11, I have shown a modified type of disc coil winding to be used with flat condenser plates, which will result in more closely approaching the uniform progress of the turns in space between the condenser plates. Here the coils 47 are dished or have a slightly conical form. The coils are so spaced and arranged between the condenser plates 48 and 49 that the outer turn of one coil lies at substantially the same distance from a condenser plate as the inner turn to which it is connected. The plates 48 and 49, as before, are connected respectively to the terminals a and b of the winding.

In Fig. 12, I have shown another modification of the method of Fig. 5, giving substantially the same result as that accomplished by the arrangement of Fig. 11. Conical condenser plates 50 and 51 are here provided, the apexes thereof being rounded off and the edges also being somewhat rolled in order to decrease the concentration of electro-static flux which would otherwise take place in these localities. The plates 50 and 51 are separated to provide the requisite space for the coils 52 of the winding; the plates being respectively connected to the terminals a and b of the winding. The coils 52 are of the ordinary flat type and are connected so as to have the inner turn of one coil joined conductively to the outer turn of the next adjacent coil. By reason of the dished shape of the condenser plates employed, the turns of the coils 52 make substantially uniform progress in space from one plate to the other.

Figure 13:
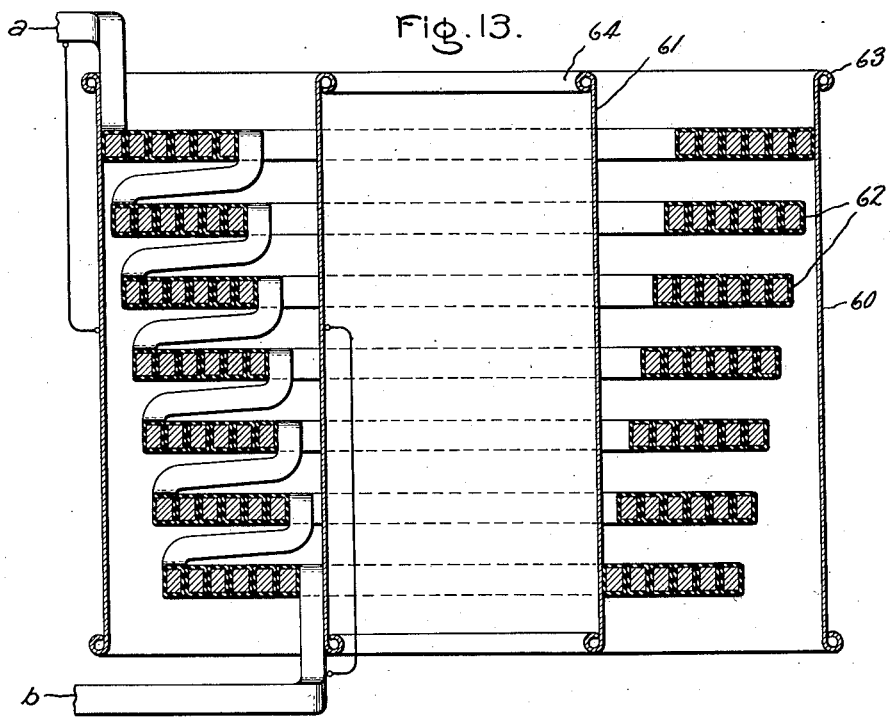

In Fig. 13, I have shown the method of Fig. 6 as applied to disc coil windings. Here concentric conducting cylinders 60 and 61 are arranged and spaced apart sufficiently to admit properly the winding comprising the coils 62.

The cylinders 60 and 61 preferably have rolled edges or beads about the upper and lower rims of each as shown at 63 and 64, and are respectively connected conductively to the terminals a and b of the winding.

The coils 62 are each of a different diameter although preferably composed of the same number of turns. This permits the coils to be progressively spaced from the condenser cylinders, so that when the inner turn of each coil is conductively connected to the outer turn of the adjacent coil taken in the order shown, there results a substantially uniform rate of progress in space for the coils between the cylinder 60 and 61, which accomplishes the desired potential distribution in accordance with the method illustrated in Fig. 6, where the coils rather than the turns are considered as the unit elements of inductance.

Figure 14:
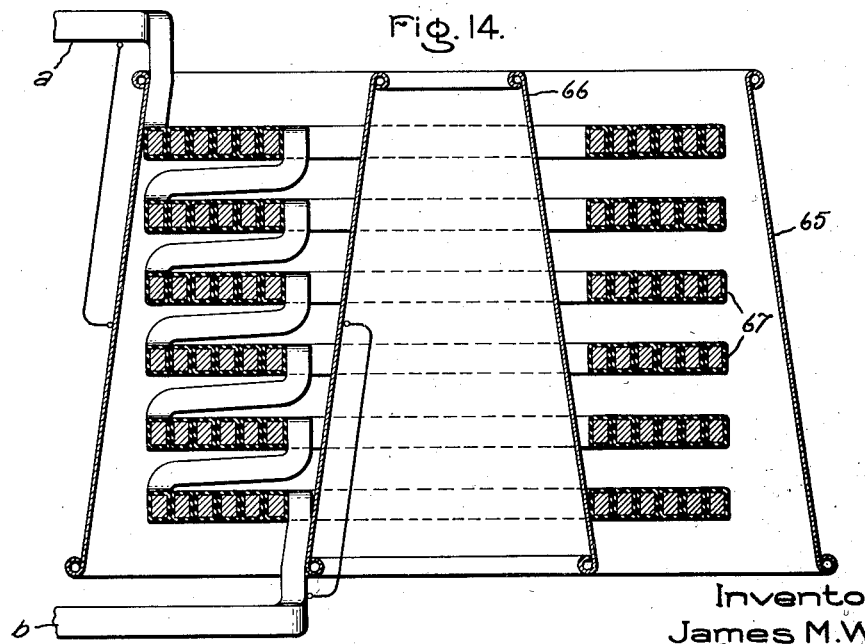

In Fig. 14, I have shown another arrangement for practically applying the method of Fig. 6 to a disc coil winding, but using coils of a uniform diameter. Here, the shape of the cylinders of the condenser are modified to accomplish this result. What I shall here style as "conical" cylinders, shown at 65 and 66, are employed. These cylinders are coaxially arranged but spaced apart to receive the uniform coils 67 and are conductively connected to the terminals a and b thereof, respectively.

The coils 67 are connected as heretofore disclosed, for example, in Fig. 7, consequently by reason of the tapered space which occurs between the cylinders 65 and 66 and the coils 67, these coils progress substantially at a uniform rate in space from one cylinder to the other, similarly to those of Fig. 13.

In Figs. 15 and 16, I have shown respectively the application of the method of Fig. 6 to the so-called "cylindrical" windings, making use respectively, in the two figures of straight conducting cylinders and "conical" conducting cylinders to form the condensers. In Fig. 15, the cylinders 70 and 71 are spaced apart to receive the winding 72 which comprise one or more "conical" cylinders or layers of turns, (three being shown). These cylinders may or may not be supported on winding forms, this being a feature left to the discretion of the designer. These layers are so proportioned however, that one will terminate and the next commence at points equally spaced from the sides of the cylinders 70 and 71, the first and last turns of the winding, formed by so connecting the layers, bearing upon and conductively connected to the conducting cylinders. Thus a winding is constructed in which the turns progress in space at substantially a uniform rate from one condenser plate to the other and the desired potential distribution is secured except for the local disturbing effects of the crossovers 73 which conductively connect the layers.

The arrangement in Fig. 16 differs from that in Fig. 15 in that straight cylindrical layers 75 are employed to form the winding between the "conical" condenser cylinders 76 and 77. The desired potential distribution is accomplished in substantially the same manner as described above for Fig. 15. It will be observed that both this form and that shown in Fig. 15 are readily adapted to be cooled by the circulation of a suitable cooling medium, such as oil or air, passing through the winding.

In Fig. 17, I have shown a modified form in which straight cylindrical shapes have been given both to the winding layers and to the condenser cylinders. In this form, the first and last layers of the winding 81 are so spaced from the condenser cylinders 82 and 83 that there is substantially uniform progress for the average turn of a winding layer passing from one condenser cylinder to the other. The first and last parts of each layer are displaced somewhat to one side or the other from the line of uniform progress when considered turn by turn, since the progress here contemplated is that of the layers and not that specifically of the turns.

In order to eliminate the local disturbance in the potential distribution, caused by making the crossover connections between layers within the space between the condenser cylinders, I have in this case brought these connections around on the outside of the cylinders 82 and 83. In this figure, the crossover connection 84, is led out from the bottom of the outermost layer, brought up on the outside and connected at the top to the middle layer. In like manner, the connection 85 is made from the bottom of the middle layer to the top of the innermost layer. This construction however, introduces a certain amount of capacitance to ground at points in the winding between the layers. This capacitance may nevertheless be eliminated by the constructions which I shall now describe.

In Figs. 18 and 19 the elimination of this ground capacitance is accomplished by inserting, between these external connections, layers of a suitable dielectric material, the connections being arranged in the same order as the respective layers of the winding themselves, this whole structure being retained between auxiliary condenser plates which are connected respectively to the main condenser plates or cylinders. In Fig. 18, the main condenser plates or cylinders are shown at 82ª and 83ª with a layer winding 81ª located between them.

The lead 84ª comes from the lower end of the outer winding layer and connects conductively with the cylindrical conductor 86 in the condenser bushing B whose cross section is shown in Fig. 20; the other end of conductor 86 being connected to the middle winding layer, as shown at 87. The lower end of this middle layer is, in turn, connected to the tubular conductor 88 in the bushing B to make connection with the inner winding layer. The conductors 86 and 88 are separated by intervening layers of dielectric material 89 and are surrounded within and without by conducting elements 90 to form the auxiliary condenser which is connected to the main condenser. In Fig. 19, the same general arrangement of the winding layers 81ᵇ and main condenser elements 82ᵇ and 83ᵇ is shown, but a different form of condenser bushing B¹ is shown. Here conducting plates 91 and 92 which may have an arcuate cross section as shown in Fig. 21 are employed. Plate 91 makes connection from the outer winding layer to the middle winding layer while plate 92 makes the connection from the middle winding layer to the inner one. These plates are separated by layers of dielectric material 93, the whole being exteriorly shielded by conducting layers or elements 94 and 95 which form the auxiliary condenser and which are conductively connected respectively to the main condenser elements 82ᵇ and 83ᵇ.

In Fig. 22, I have shown an arrangement for entirely avoiding the ground capacitance of cross-over connections. Here straight cylindrical condenser elements 100 and 101 are employed between which are arranged a plurality of "conical" cylindrical layers of winding 102. The use of cross-over connections traversing the space between condenser elements is avoided by the use of alternate inverted conical layers as shown at 103. In this manner a multi-layer winding is made to progress at a uniform rate in space turn by turn from one condenser element to the other without ground capacitance arising from the cross-overs.

In Fig. 23, I have shown an arrangement permitting the same result to be approximately accomplished with straight cylindrical layers of winding, and at the same time adapted to permit of being adequately ventilated by a suitable cooling and insulating medium. Here again straight cylinders 105 and 106 are employed as the condenser elements between which are placed the layers of winding 107. These layers are not full length cylinders, each being but a fraction of the full length. The layers employed are alternate long and short layers of winding having varying diameters. To the outer long layer 107ª, which is connected to the terminal a, is connected the short layer 107ᵇ at 108, the latter layer being of slightly smaller diameter. This layer 107ᵇ is in turn connected to long layer 107ᶜ at 109, the layer 107ᶜ being of still small diameter, placed within the former layer, and spaced therefrom in order to provide a ventilating space. Layer 107ᶜ is connected to short layer 107ᵈ at 110, this layer 107ᵈ being of smaller diameter than layer 107ᶜ; the layer 107ᵈ is in turn connected to layer 107ᵉ at 111 which latter is in turn connected to layer 107ᶠ. This last layer is connected to terminal b. It is seen that by this arrangement the average turns of these layers make substantially uniform progress in space from one condenser element to the other, the connections between layers being made without perceptible capacitance to ground. This type of winding may be used with advantage where it is desired to to bring out taps from the turns as indicated at 115.

In Figs. 24 to 26 is shown a transformer constructed to have its high voltage winding protected in accordance with methods of this invention. Here 120 represents a shell type core having cylindrical windings assembled about its central leg 121. The low voltage winding 122 is shown as supported by the insulating cylinder 123, which in turn is supported by the leg 121. Exteriorly of and concentric with this low voltage winding is the high voltage winding, comprising the plurality of cylindrical layers 124 supported on insulating cylinders 125. These layers are held in properly spaced relation by means of the spacing strips 126. The innermost insulating cylinder 125′ and the outermost cylinder 125″ are overlayed on their inner and outer sides respectively with a layer of conducting material, such as tin or aluminum foil, shown at 127. These conducting layers form the elements of the protecting condenser and are provided with rolled edges as shown at 128.

The line lead 130 is brought through the terminal supporting bushing 131, mounted on the core structure. The lead is then led to the outermost layer of the winding 124, a connection 132 being led off from the lead 130, to conductively connect with the outer conducting cylinder 126. In the arrangement shown the other terminal of winding 124 as well as the other condenser element would be connected to ground. The terminal structure for the low voltage winding is shown at 133, which is also suitably supported by the core structure.

The cross-over connections between layers of the high voltage winding are shown as made in the manner indicated in Fig. 17, the connections being individually carried through the tubular bushing structures shown at 134.

In Fig. 27 there is shown an arrangement adapted for a small high voltage transformer. The core 140 supports an insulating cylinder 141 on its central leg 142, which cylinder has the low voltage winding 143 on it. This winding is surrounded by the high voltage winding 144 which is wound on insulating cylinders 145 in a manner to eliminate ground capacitance which I will presently describe. The inner cylinder 145 is spaced from the low voltage winding 143 by spacing strips 146 and carries the conducting cylinder 147. The companion condenser element 148 is carried on the external insulating cylinder 149, these conducting cylinders being connected in the manner heretofore described to the winding terminals, as indicated at 150.

To avoid the necessity of long cross-over connections between the winding layers and the consequent capacity between such connections and ground, I lay this winding 144 on the cylinders 145 in a special manner which will be understood by reference to Fig. 28. Each hard insulating cylinder 145 is first overlaid by a layer of some soft fabric, as shown at 145ª, such as felt or blotting paper in order to prevent the slipping of the winding as it is laid on the cylinder. Suppose it is desired to wind a four layer winding upon the cylinder, the first turn 151 of insulated conductor is laid as near the end of the cylinder as desirable. The second turn 152 is laid beside it; instead of continuing this layer on the surface of the cylinder, resulting in the introduction of ground capacitance between this layer and the next, the third turn 153 is laid in the gutter between the first two turns. The next turn 154 is laid beside turn 152, the next 155 in the gutter between the turns 152 and 154, the next turn 156 in the gutter between the turns 153 and 155. The next turn 157 is again laid on the cylinder 145, the next succeeding turns 158, 159 and 160 each being laid in the consecutive gutters formed by the laying of the previous turn. The turn 160 is the fourth above the cylinder 145 and completes a pyramid of ten turns after which the winding would be built no higher in the case supposed, the next turn 161 being laid on the cylinder, the three following turns likewise being laid in the successive gutters formed. This initial pyramid is the sum of one, two, then three, and then four turns, which for an $n$-layer winding would have $(\Sigma n)$ turns when expressed symbolically. Every fourth turn subsequently recurring in the winding built on the side of this pyramid is hence laid on the cylinder 145. The crossovers going from the turns 153, 156, 160, etc. down to the cylinder are preferably distributed about the cylinder so that the winding will present a symmetrical appearance, an even surface, and for a given number of turns and layers will have a minimum length.

In Fig. 29 I have shown an arrangement of windings applicable to core type transformers. The core 200 has a low voltage winding 201 on each leg 202. The high voltage winding 203 includes a section mounted exteriorly of the low voltage winding on each leg and is of the type shown in Fig. 15, but each section is here illustrated for the sake of simplicity as composed of but one conical layer. Each high voltage winding section is shielded by conducting cylinders 204 and 205 which form the condensers between whose elements the turns are progressively arranged. One terminal $a$ is shown connected, at the left of the figure, both to the winding and to cylinder 204. The connection 206 connects the two winding sections together and is also connected to cylinders 205. For single phase, this type of winding is preferably grounded at its mid point, as indicated at $d$. This ground connection tends to equalize the voltage distribution between the winding sections on the two legs, otherwise where two such winding sections are connected in series, the voltages across the two are not necessarily equal and under certain conditions the algebraic sum of the voltages across the winding sections individually may exceed the total terminal voltage. Such difference is, in a measure, due to capacitance to ground of the condenser plates 205, but the connection at $d$ short-circuits this capacitance. It will be readily understood that where this type of transformer is one of a set in service on a polyphase system such ground connection is impractical. The connecting in series of the windings for such a system may nevertheless be made safe by providing means for restricting the voltages which may appear across the individual windings to safe values. One method for accomplishing this voltage limitation comprises the use of an ordinary lightning arrester across the individual windings, such as I have shown at L in this figure.

In Fig. 30 I have shown the application of this arrangement to polyphase transformers. The core 210 has three legs 211, 212 and 213, each of which carries a low voltage winding 215 and an exterior high voltage winding 216, which latter windings are here again shielded by exterior and interior conducting cylinders 217 and 218 respectively. These cylinders comprise the condenser elements between which the windings 216 progress, these elements being respectively connected to the upper and lower terminals of the windings. The three leads $a$, $b$ and $c$ from a three phase circuit connect to the respective windings on the legs 211, 212 and 213 as shown; while the lower terminals are connected together as shown by the connection 219 to make a star-connected system. This connection is preferably grounded as shown at $d^1$ in order that the voltage across each high voltage winding will be that existing between line terminals and ground.

It will be understood, moreover, that where a plurality of such windings as I have just shown are connected in series, as by a connection similar to that at 219, the conditions occasioned thereby become substantially that symbolically depicted in Fig. 1 where the windings represent the equal parts of the total inductance represented at W, the equal parts of capacitance in parallel with the windings by the condensers S, and their capacitance to ground by the condensers G. The methods of Figs. 3 and 4, then obviously apply where it is desired to control and equally distribute the voltage across a plurality of windings connected on a system by a series connection. Resort to the use of lightning arresters may also be had to accomplish the limitation of the voltage across the individual windings, as heretofore pointed out.

Having now described several embodiments of my invention which are at present the best means known to me for carrying the same into effect, I would have it understood that these are merely illustrative and that I do not mean to be limited thereby to the precise details shown, nor restricted in the choice of recognized equivalents except as defined in my claims hereunto annexed.

What I claim as new and desire to secure by Letters Patent of the United States, is:—

1. The combination in electrical apparatus, of a winding, and means for making the potential gradient due to capacitance substantially coincident with that due to inductance, whereby a substantially uniform potential gradient is maintained in said winding upon a sudden increase of potential across its terminals.

2. The combination in electrical apparatus, of a winding, and means for making the ratio of capacitances in parallel with any two portions of the winding inversely proportional to the ratio of inductances in said portions respectively, whereby a substantially uniform potential gradient is maintained in said winding upon a sudden increase of potential across its terminals.

3. The combination in electrical apparatus, of a winding, and a condenser to whose elements the ends of said winding are respectively conductively connected, the turns of said winding progressing through the space between said condenser elements in a substantially uniform manner from one element to the other.

4. The combination in electrical apparatus, of a winding, and a condenser to whose elements the ends of said winding are respectively conductively connected, said winding being located in the space between said condenser elements with its turns progressing from one element to the other at a rate coincident with the potential gradient between said elements.

5. The combination in electrical apparatus of a winding having portions of varying capacitance to ground, and means for substantially neutralizing the effect of the capacitance to ground to prevent disturbance of the potential gradient in said winding.

6. In electrical apparatus, the combination with a core, of a winding mounted thereon, and means to neutralize the effect of the electrostatic capacity between said winding and said core to prevent disturbance of the potential gradient in said winding.

7. In electrical apparatus, the combination of a winding, and means to neutralize the effect of the electrostatic capacity between said winding and ground to prevent disturbance of the potential gradient in said winding upon a change of voltage across its terminals.

8. In electrical apparatus, the combination with a core, of a winding mounted thereon, and shielding condenser plates conductively connected to said winding to supply current to compensate for current flowing through the capacity between said winding and ground.

9. In an electrical apparatus, the combination with a winding, of condenser elements in conductive relation to said winding, said condenser elements providing capacity paths to supply current to said winding for maintaining a substantially uniform rate of increase of current in all portions of the winding upon sudden increase of potential across its terminals.

10. In an electrical apparatus, the combination with a core, of a pair of spaced concentric condenser elements surrounding said core, and a cylindrical winding in the space between said condenser elements and with its terminals connected respectively to said elements, said condenser elements providing capacity paths to supply current to said winding for maintaining a substantially uniform potential gradient therein upon a sudden increase of potential across its terminals.

11. In an electrical apparatus, a winding comprising a plurality of layers, main condenser elements enclosing said layers and to which the terminals of said winding are conductively connected, series connections between consecutive layers of said winding, said series connections being arranged exteriorly of said main condenser elements and arranged in the same order as the respective layers which they connect, and auxiliary condenser elements encasing said series connections and connected respectively to said main condenser elements.

12. In an electrical apparatus, the combination with main condenser elements of a winding in sections whose turns progress from one of said elements to the other and whose terminals are respectively conductively related to said elements, series connections for said sections exterior to said elements, and a condenser bushing encasing said series connections and provided with exterior and interior conducting elements connected to said main condenser elements.

In witness whereof, I have hereunto set my hand this 27th day of January 1920.

JAMES M. WEED.